(12) United States Patent
Dustin et al.

(10) Patent No.: US 12,049,534 B1
(45) Date of Patent: Jul. 30, 2024

(54) POLYURETHANE FOAMS CONTAINING UNMODIFIED LIGNIN

(71) Applicant: GM Global Technology Operations LLC, Detroit, MI (US)

(72) Inventors: Ashley Dustin, Santa Monica, CA (US); Janet C. Robincheck, Sterling Heights, MI (US); Matthew Vandyke, Warren, MI (US); Megan Shewey, Warren, MI (US); Adam F. Gross, Malibu, CA (US); Andrew P. Nowak, Malibu, CA (US); Dylan Hollrigel, San Clemente, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/169,676

(22) Filed: Feb. 15, 2023

(51) Int. Cl.
*C08J 9/12* (2006.01)
*C08G 18/08* (2006.01)
(Continued)

(52) U.S. Cl.
CPC .............. *C08G 18/14* (2013.01); *C08G 18/18* (2013.01); *C08G 18/242* (2013.01); *C08G 18/6204* (2013.01); *C08J 9/0004* (2013.01); *C08J 9/0023* (2013.01); *C08J 9/0061* (2013.01); *C08J 9/125* (2013.01); *C08J 9/141* (2013.01); *C08L 75/08* (2013.01); *C08L 83/04* (2013.01); *C08L 97/005* (2013.01); *C08G 2101/00* (2013.01); *C08G 2110/0016* (2021.01); *C08G 2110/0041* (2021.01); *C08J 2201/022* (2013.01); *C08J 2203/10* (2013.01); *C08J 2203/16* (2013.01);
(Continued)

(58) Field of Classification Search
CPC ........ C08J 9/0023; C08J 9/141; C08J 9/0004; C08J 2375/04; C08J 2203/14; C08J 2203/16; C08J 2201/022; C08J 9/125
See application file for complete search history.

(56) References Cited

U.S. PATENT DOCUMENTS

2015/0144829 A1     5/2015  Grünbauer
2017/0253689 A1*    9/2017  Moon ................ C08G 18/6492
(Continued)

FOREIGN PATENT DOCUMENTS

CA        2164467 A1 *  6/1996   ............. C08G 18/64

OTHER PUBLICATIONS

A. Duval, D. Vidal, A. Sarbu, W. René, L. Avérous, Scalable single-step synthesis of lignin-based liquid polyols with ethylene carbonate for polyurethane foams,Materials Today Chemistry, vol. 24, 2022, 100793, ISSN 2468-5194, https://doi.org/10.1016/j.mtchem.2022.100793.

(Continued)

*Primary Examiner* — Michael L Leonard
(74) *Attorney, Agent, or Firm* — Vivacqua Crane, PLLC (57) ABSTRACT

A polyurethane foam and a method of forming a polyurethan foam. The polyurethane foam including the reaction product of polyethylene glycol and polypropylene copolymer polyol, a gelation catalyst, a blowing catalyst, lignin, a polymeric isocyanate, and a blowing agent. The method includes mixing polyethylene glycol and polypropylene copolymer polyol, a gelation catalyst, a blowing catalyst, lignin, a polymeric isocyanate, and a blowing agent. Vehicle components are formed from the polyurethane foam.

20 Claims, 5 Drawing Sheets

(51) Int. Cl.
  *C08G 18/18* (2006.01)
  *C08G 18/24* (2006.01)
  *C08G 18/62* (2006.01)
  *C08J 9/00* (2006.01)
  *C08J 9/14* (2006.01)
  *C08L 75/08* (2006.01)
  *C08L 83/04* (2006.01)
  *C08L 97/00* (2006.01)
  *C08G 101/00* (2006.01)

(52) U.S. Cl.
  CPC ........ *C08J 2205/06* (2013.01); *C08J 2375/04* (2013.01); *C08J 2375/08* (2013.01); *C08J 2483/04* (2013.01); *C08J 2497/00* (2013.01); *C08L 2203/14* (2013.01)

(56) References Cited

U.S. PATENT DOCUMENTS

2018/0079871 A1* 3/2018 Tudman ................ C08G 18/48
2018/0312625 A1* 11/2018 Phanopoulos ..... C08G 18/8019
2022/0064363 A1 3/2022 Nejad et al.

OTHER PUBLICATIONS

Annamalai, et al. Dispersion Methodology for Technical Lignin into Polyester Polyol for High Performance Polyurethane Insulation Foam. ACS Appl. Polym. Mater. 2021, 3, 3528-3537.
Arpadis, Polyether Polyols, https://www.arpadis.com/polyether-polyols/#:~:text=Polyether%20polyols%20are%20key%20components,compared%20to%20polyester%2Dbased%20polyurethanes (accessed Jan. 4, 2023).
Averous, et al. Original Polyols Based on Organosolv Lignin and Fatty Acids: New Bio-Based Building Blocks for Segmented Polyurethane Synthesis. Green Chem. 2014, 16, 3958-3970.
BASF Corporation, Pluracol 380 Polyol, Jul. 20, 2020, Version 8.0, Safety Data Sheet.
BASF Corporation, Pluracol 380 Specialty Polyol, 2018 Technical Bulletin.
BASF Intermediates, Polyurethane Catalysts, Lupragen, United States (2020).
Chu, et al. Integration of Lignin and Acrylic Monomers Towards Grafted Copolymers by Free Radical Polymerization. Int. J. Biol. Macromol. 2014, 67, 483-489.
Covestro LLC, Mondur MR-LIGHT, Product Datasheet, Jul. 23, 2018.
Datta, J., Kosiorek, P. & Włoch, M. Synthesis, structure and properties of poly(ether-urethane)s synthesized using a tri-functional oxypropylated glycerol as a polyol. J Therm Anal Calorim 128, 155-167 (2017). https://doi.org/10.1007/s10973-016-5928-2.
Dobado, et al. Lignin as Renewable Raw Material. Chem. Sus. Chem. 2010, 3, 11, 1227-1235.
Epps, et al. Softwood Lignin-based methacylate polymers with tunable thermal and viscoelastic properties. Macromolecules. 2016, 49, 4, 1286-1295.
Evonik Industries AG, TEGOAMIN, Technical Information, Aug. 2010.
Lignin—an overview, ScienceDirect (accessed Jan. 26, 2023).
Lisý A, Ház A, Nadányi R, Jablonský M, Šurina I. About Hydrophobicity of Lignin: A Review of Selected Chemical Methods for Lignin Valorisation in Biopolymer Production. Energies. 2022; 15(17):6213. https://doi.org/10.3390/en15176213.
Ma, X., Chen, J., Zhu, J., Yan, N., Lignin-Based Polyurethane: Recent Advances and Future Perspectives. Macromol. Rapid Commun. 2021, 42, 2000492. https://doi.org/10.1002/marc.202000492.
Ostendorf, Kolja et al., 2.1.1. Kraft Lignon, Polymers (Basel), Mar. 2021, pp. 1-3, DOI:10.3390/polym13071088 United States.
Quality Foam, Polyether Polyurethane, http://www.qualityfoam.com/polyether-polyurethane.asp (accessed Jan. 4, 2023).
Sardon, Haritz and Pascual, Ana and Mecerreyes, David and Taton, Daniel and Cramail, Henri and Hedrick, James L., Synthesis of Polyurethanes Using Organocatalysis: A Perspective, Macromolecules, 48, 10, 3153-3165, 2015, 10.1021/acs.macromol.5b00384.
Silicone surfactants that support improved foam properties, DOW, VORASURF Silicone Polyurethane Additives selection guide, 2022, pp. 1-8, United States.
Sun et al. Rapid room temperature solubilization and depolymerization of polymeric lignin at high loadings. Green Chem., 2016, 18, 6012-6020.
Tolbert, A., Akinosho, H., Khunsupat, R., Naskar, A.K. and Ragauskas, A.J. (2014), Characterization and analysis of the molecular weight of lignin for biorefining studies. Biofuels, Bioprod. Bioref., 8: 836-856. https://doi.org/10.1002/bbb.1500.
UPM Biochemicals; Lignin solutions to exceed your expectations, https://www.upmbiochemicals.com/lignin-solutions/products/UPM-BioPiva-product-family/ (accessed Jan. 26, 2023).
Upmbiochemicals, UPM BioPiva 395, Technical Data Sheet, https://www.upmbiochemicals.com/siteassets/documents/lignin/upm-lignin-factsheet-395.pdf (accessed Jan. 26, 2023).
Zinovyev G, Sumerskii I, Rosenau T, Balakshin M, Potthast A. Ball Milling's Effect on Pine Milled Wood Lignin's Structure and Molar Mass. Molecules. Sep. 1, 2018;23(9):2223. doi: 10.3390/molecules23092223. PMID: 30200441; PMCID: PMC6225492.

* cited by examiner

POLYURETHANE FOAMS CONTAINING UNMODIFIED LIGNIN

BACKGROUND

Polyurethane foams are used in a number of applications, including vehicle applications. For example, polyurethane foams are used in seating, insulation panels, pillars, headliners, suspension insulators, bumpers, dashboards, and other components. Polyurethane foams are generally formed by reacting a polyol with toluene diisocyanate or methylene diphenyl diisocyanate.

To incorporate sustainable materials into polyurethane foam, and due to its reactive functional groups, attempts have been made to incorporate lignin into polyurethane foams. Lignin is natural, renewable material that is found in the tissue of plants. It is a byproduct of wood processing and paper production and is often treated as waste or burned as a fuel. However, incorporation of lignin into polyurethane has been met with various challenges including, poor solubility and dispersibility in precursor materials, inconsistent mechanical performance due, in part, to irregularity of lignin structure, and undesirable performance attributes due to inherent molecular rigidity. To address the poor dispersibility, mechanical processes and chemical treatments of the lignin have been used to formulate polyurethane foams with lignin.

Thus, while previous methods of incorporating lignin into foams have been used, room remains for improvement in methods and systems for incorporating lignin into polyurethane foams.

SUMMARY

Aspects of the present disclosure related to a polyurethane foam. The polyurethane foam includes the reaction product of polyethylene glycol and polypropylene copolymer polyol, a gelation catalyst, a blowing catalyst, lignin, a polymeric isocyanate, and a blowing agent.

In embodiments of the above, the lignin is present in a range of 10 parts per hundred resin to 30 parts per hundred resin of the polyol. In further embodiments, the lignin exhibits a particle size of less than 200 micrometers in length. In yet further embodiments, the lignin is kraft lignin.

In any of the above embodiments, the polyethylene glycol and polypropylene copolymer polyol is present in a range of 65 parts per hundred resin to 95 parts per hundred resin of the polyol.

In any of the above embodiments, the blowing agent is water and present in a range of 0.1 parts per hundred resin to 6 parts per hundred resin of the polyol.

In any of the above embodiments, the mixture further includes a surfactant. In further embodiments, the surfactant is an organo-modified polysiloxane present in a range of 0.1 parts per hundred resin to 5 parts per hundred resin of the polyol.

In any of the above embodiments, the gelation catalyst comprises dibutyltin dilaurate catalyst and a tertiary amine catalyst. In further embodiments, the dibutyltin dilaurate catalyst is present in a range of 0.1 parts per hundred resin to 5 parts per hundred resin of the polyol and the tertiary amine catalyst is present in a range of 0.1 parts per hundred resin to 5 parts per hundred resin of the polyol.

In any of the above embodiments, the mixture further includes a crosslinker.

In any of the above embodiments, the polymeric isocyanate is present in a range of 0.5 to 1 equivalent to the polyol. In further embodiments, the polymeric isocyanate is methylene diphenyl diisocyanate.

According to various aspects, the present disclosure relates to a vehicle component. The vehicle component includes a polyurethane foam. The polyurethane foam includes a reaction product of: a mixture of polyethylene glycol and polypropylene copolymer polyol, a gelation catalyst, a blowing catalyst, lignin, a polymeric isocyanate, and a blowing agent, and wherein the polyethylene glycol and polypropylene copolymer polyol.

In embodiments of the above, the polyurethane foam exhibits a density in a range of 20 kilograms per cubic meters to 250 kilograms per cubic meter, a compression set at 50% compression in a range of less than 40, and a modulus in a range of 1 kPa to 110 kPa.

In alternative embodiments of the above, the vehicle component of claim 14, wherein the polyurethane foam exhibits a density in a range of 20 kilograms per cubic meters to 800 kilograms per cubic meter and an elastic modulus of greater than 110 kPa.

In any of the above embodiments, the vehicle component comprises one of a seat, a headrest, an arm rest, a headliner, a console, a steering wheel, and an instrument panel.

According to various aspects, the present disclosure relates to a method of forming a polyurethane foam. The method includes mixing a polyethylene glycol and polypropylene copolymer polyol, a gelation catalyst, a blowing catalyst, lignin, a blowing agent, and a polymeric isocyanate, wherein the polyethylene glycol and polypropylene copolymer polyol exhibits molecular weight in a range of 1,000 to 10,000.

In embodiments of the above, the method further includes mixing the polyethylene glycol and polypropylene copolymer polyol with the lignin prior to mixing in the gelation catalyst, the blowing catalyst, the blowing agent and polymeric isocyanate.

In embodiments of the above, the method further includes mixing the polyethylene glycol and polypropylene copolymer polyol with the lignin and allowing the polyethylene glycol and polypropylene copolymer polyol with the lignin to rest prior to mixing with the gelation catalyst, the blowing catalyst, the blowing agent and polymeric isocyanate.

BRIEF DESCRIPTION OF DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. Furthermore, there is no intention to be bound by any expressed or implied theory presented in the preceding introduction, summary, or the following detailed description. It should be understood that throughout the drawings, corresponding reference numerals indicate like or corresponding parts and features.

As used herein, the term "vehicle" is not limited to automobiles. While the present technology is described primarily herein in connection with automobiles, the technology is not limited to automobiles. The concepts can be used in a wide variety of applications, such as in connection with motorcycles, mopeds, locomotives, aircraft, marine craft, and other vehicles, as well as in other applications where polyurethane foam may be incorporated, including home furnishings, appliances, or insulation. Applications include, for example, vehicle seats, headliners, insulation, and other components.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale.

The present disclosure is directed to systems, methods and products for polyurethane foams containing unmodified lignin. In embodiments, the foams are flexible polyurethane foams and are understood to exhibit a compression set at 50% of less than 40%, a modulus of elasticity in the range of 1 kPa to 110 kPa, and a density in the range of 20 kg/m$^3$ to 250 g/m$^3$. In alternative embodiments, the foams are rigid polyurethane foams and are understood to exhibit a modulus of elasticity in the range of greater than 110 kPa, such as in the range of 125 kPa to 140 kPa, and a density in the range of 20 kg/m$^3$ to 800 g/m$^3$. It should be appreciated, however, that the present application also provides for foams of higher compression sets for providing relatively more rigid foam for different applications.

Figure 1A:
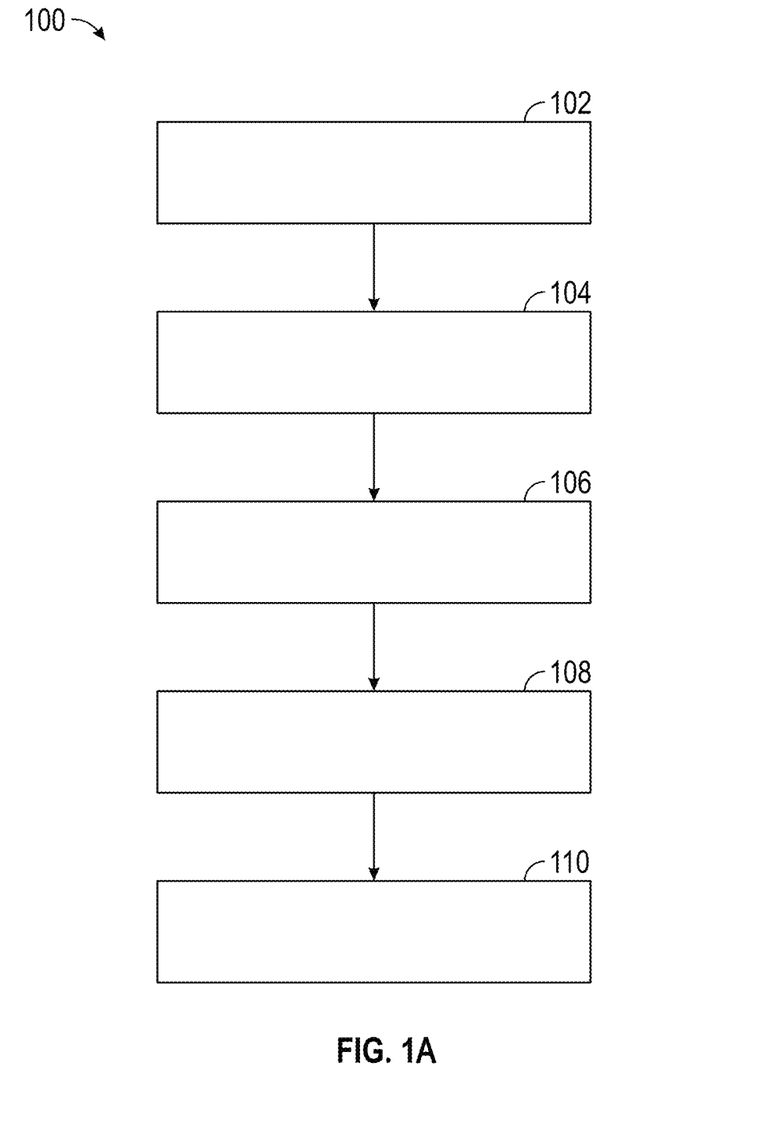
FIG. 1A illustrates a flow chart of an embodiment of a process of forming polyurethane foam incorporating lignin according to various aspects of the present disclosure.

Reference is made to FIG. 1A, which illustrates a process 100 for formulating a flexible polyurethane foam containing unmodified lignin. In embodiments, the process is completed at room temperature, or a temperature in the range of 21 degrees Celsius to 23 degrees Celsius, including all values and ranges therein. The process begins at block 102 with the formation of a polyol mixture. The polyol mixture comprises a polyether polyol mixed with unmodified lignin and, optionally, a surfactant. The polyether polyol and lignin each contribute to the total amount of polyol in the resin.

The polyether polyol includes a primary, hydroxyl (—OH) terminated polyol exhibiting a functionality of 2 or greater, such as in the range of 2 to 4. In embodiments, the hydroxyl (—OH) terminated polyol is a triol. The hydroxyl number of the polyether polyol is in the range of 20 mg KOH/g to 30 mg KOH/g, including all values and ranges therein such as in the range of 24.0 mg KOH/g to 26.0 mg KOH/g. In embodiments, the nominal molecular weight of the polyether polyol is in the range of 1000 Daltons to 10000 Daltons including all values and ranges therein, such as in the range of 6000 Daltons to 7000 Daltons. In embodiments, molecular weight may be measured by ASTM D4274, titled Determination of Hydroxyl Numbers of Polyols. The viscosity of the polyether polyol may be in the range of 1300 centipoise to 1400 centipoise at a temperature of 77 degrees ° C., including all values and ranges therein, to a viscosity in the range of 325 centipoise to 425 centipoise at a temperature of 140 degrees ° F. In embodiments, the polyol includes a copolymer of ethylene glycol and propylene glycol. For example, the polyol includes PLURACOL 380 available from BASF. The polyether polyol is present in the polyol mixture in the range of 65 parts per hundred resin to 95 parts per hundred resin of the polyol (including both the polyether polyol and lignin), including all values and ranges therein.

Unmodified lignin is understood as lignin that is a by-product of processes for removing cellulose from wood for producing products such as paper. In being unmodified, the lignin is not chemically functionalized after removing the lignin from the cellulose. The lignin and is either sulfur or sulfur-free lignin. In embodiments, the lignin is kraft lignin, which is a by-product of kraft pulp method of converting softwood into pulp. The lignin exhibits an average molecular weight in the range of 4,000 to 10,000, including all values and ranges therein such as 5,500 to 6,500, measured using gel permeation chromatography according to ASTM D5296-11. In embodiments, the lignin includes water present at less than or equal to 6 weight percent of the total weight of the lignin, including all values and increments therein, such as less than or equal to 3 weight percent, or less than or equal to 2 weight percent. The lignin is present in the polyol mixture in the range of 10 parts per hundred resin to 30 parts per hundred resin of the polyol, including all values and ranges therein.

In embodiments, a surfactant is also optionally incorporated into the polyol mixture. In embodiments, the surfactant includes, for example, a polyoxyalkylene block copolymer or a silicone surfactant including for example, an organo-modified polysiloxane, such as polysiloxane ether. Examples include surfactants available under the TEGOSTAB mark available from EVONIK and VODASURF DC 6070, available from Dow. In embodiments, the calculated OH number of the surfactant is in the range of 45 mg KOH per gram to 55 mg KOH per gram, including all values and ranges therein, such as 51 mg KOH per gram. In embodiments, the calculated OH number may be measured using ASTM E1899-16 or ISO 4629-2. The surfactant exhibits a viscosity in the range of 65 mPa*s to 75 mPa*s, including all values and increments therein, such as 70 mPa*s and a capillary viscosity in the range of 60 to 80 centistokes, including all values and ranges therein such as 62 to 76, at 25° C. The surfactant is present in the polyol mixture in the range of 0.1 parts per hundred resin to 5 parts per hundred resin of the polyol, including all values and ranges therein, such as from 1 parts per hundred resin to 3 parts per hundred resin of the polyol or 2 parts per hundred resin of the polyol.

The constituents of the polyol mixture, i.e., the polyether polyol, lignin, and, optionally, the surfactant, are combined together. In embodiments, the constituents are mixed in a mixer, such as a centrifugal mixer, paddle mixer or dispersion disc mixer, at speeds in the range of 1500 rotations per minute to 2500 rotations per minute, including all values and ranges therein, for a time period in the range of 1 minutes to 60 minutes, including all values and ranges therein.

At block 104, the polyol mixture is then optionally allowed to rest for a first rest period. The first rest period is in the range of a minute to two weeks, including all values and ranges therein, such as from 12 hours to two weeks. In embodiments, during the first rest period, particles of agglomerated lignin are reduced in size by at least 10 percent to at least 90 percent of the initial particle size, the reduction increasing with an increase in the time period. In embodiments, the lignin particles are reduced from 50 micrometers to 150 micrometers in size to less than 45 micrometers to less than 5 micrometers, including all values and ranges therein. Thus, after two weeks of rest time, 100 micrometers particles may be reduced to less than 10 micrometer particles. Alternatively, block 104 may be skipped and the process may transition from block 102 directly to block 106.

At block 106 the polyol mixture is then mixed with a gelation catalyst, blowing catalyst, and blowing agent. The gelation catalyst includes an organometallic catalyst, an amine catalyst, or a combination thereof. The organometallic catalyst includes, for example, a tin catalyst such as dibutyltin dilaurate or dioctyltin carboxylate. In additional embodiments, the gelation catalyst is dibutyltin dilaurate and used in combination with dibutyltin dioctanoate. Alternatively, or additionally, the organometallic catalyst includes a zinc catalyst, stannous octoate, a bismuth carboxylate catalyst, a zirconium neodecanoate catalyst, tin(II)-isononanoate, a titanium-based catalyst or an aluminum-based catalyst. The amine catalyst includes, for example, a tertiary amine catalyst, including cyclic or aliphatic tertiary amines, such as dimethylethaneolaimine, 2,2'-dimorpholinodiethylether, dimethylcyclohexylamine, 1,8-diazabicyclo[5.4.0]undec-7-ene, triethylene diamine, 2,2'-oxydiethanamine, 2,2'-oxybis(N,N-dimethylethylamine), dimethylethanolamine, pentamethyldiethylenetriamine, dimethylaminoethoxyethanol, N,N,N',N'-Tetramethyl-1,6-hexanediamine, 1,3,5 tris(dimethylaminopropyl)-hexahydro-s-triazine, N,N,N'-trimethylaminoethylethanolamine, and bis(2-dimethylaminoethyl)ether. In embodiments, the catalyst are available under the TEGOAMIN brand from EVONIK, under the DABCO brand (such as DABCO NE 500) from EVONIK, KOSMOS catalysts available from EVONIK, and POLYCAT DBU also available from EVONIK. Further, an emulsifier, such as polyether siloxane may be incorporated in the polyol mixture.

The blowing agent includes water and, in embodiments, is purified through processes such as deionization. In further embodiments, the blowing agent is the water carried by the lignin as described above. The blowing catalyst includes, for example, pentamethyldiethylenetriamine and dipropylene glycol. In one embodiment, the blowing catalyst includes TEGOAMIN E 10, available from EVONIK, which includes polyether siloxane, and DABCO NE 300 also available from EVONIK. The polyol mixture, gelation catalyst(s), blowing agent, and, optionally, the blowing catalyst, form a polyol mixture. The polyol mixture is combined by mixing, such as with a centrifugal mixture, at a speed in the range of 1500 rotations per minute to 2500 rotations per minute, including all values and ranges therein, for a period of time in the range of 1 to 60 minutes, including all values and ranges therein.

The catalyst(s) are present in a range of 0.1 parts per hundred resin to 10 parts per hundred resin of the polyol, including all values and ranges therein such as 1.0 parts per hundred resin to 5.0 parts per hundred resin of the polyol. In embodiments, where multiple catalysts are present, dibutyltin dilaurate organometallic catalyst is present in the range of 0.1 parts per hundred resin to 5.0 parts per hundred resin of the polyol, including all values and ranges therein, such as 1.5 parts per hundred resin to 2.9 parts per hundred resin of the polyol or 2.0 parts per hundred resin of the polyol, and the tertiary amine catalyst is present in the range of 0.1 parts per hundred resin to 5.0 parts per hundred resin of the polyol, including all values and increments therein, such as in the range of 0.1 parts per hundred resin to 1.0 parts per hundred resin of the polyol, or 0.5 parts per hundred resin of the polyol. In addition, a blowing agent is included. In embodiments, the blowing agent is a non-physical blowing agent. In embodiments, purified water is present in a range of 0.1 parts per hundred resin to 6 parts per hundred resin of the polyol, including all values and ranges therein such as 1 part per hundred resin of the polyol.

Further, a crosslinker may be added to the polyol mixture. For example, a small molecule alcohol with a functionality of greater than or equal to 2, including all values and ranges from, e.g., 2 to 4, is included in the polyol mixture. In embodiments, the crosslinker includes diethaneolamine, glycerol propoxylate. In embodiments, the crosslinker includes ORTEGOL 204 available from EVONIK. The crosslinker may be present in a range of 0.01 to 5 parts per hundred resin of the polyol, including all values and ranges therein. In addition, in embodiments, cell openers may also be incorporated into the polyol mixture. Cell openers include, for example, poly-(oxyethylene) compounds, siloxane-oxyalkylene copolymers, and wax substances. Cell openers may include, TEGOSTAB B 8948 or GORAPUR IMR 85, both available from EVONIK.

At block 108 a polymeric isocyanate is added to the polyol mixture. The polymeric isocyanate has a functionality in the range of 1.8 to 4, including all values and ranges therein, including 2 and 3. The polymeric isocyanate is an aliphatic or aromatic isocyanate such as 2,4'-methylene diphenyl diisocyanate, 4,4'-methylene diphenyl diisocyanate, blends of 2,4'-methylene diphenyl diisocyanate and 4,4'-methylene diphenyl diisocyanate, toluene diisocyanate and hexamethylene diisocyanate. The polymeric isocyanate exhibits an NCO content in the range of 25 weight percent to 40 weight percent, including all values and ranges therein. Further, the polymeric isocyanate exhibits a viscosity in the range of 50 to 300 mPa*s, including all values and ranges therein. The polymeric isocyanate is added in an amount in the range of 0.5 to 1 equivalent to the polyol (again including the polyether polyol and lignin), wherein one equivalent is understood the amount of one substance that reacts with one mole of another substance. In embodiments, the polymeric isocyanate is added to the polyol mixture in a weight ratio of 1 part of the polymeric isocyanate to in the range of 4 to 6 parts of the polyol mixture, including all values and ranges therein. The polymeric isocyanate was added to the polyol mixture and mixed with a mixer, such as a centrifugal mixer, paddle mixer or dispersion disc mixer, at a speed in the range of 1500 rotations per minute to 2500 rotations per minute, including all values and ranges therein, for a period of 5 seconds to 30 seconds, including all values and ranges therein. At block 110, the foam is optionally allowed to rest for a second resting period prior to use. The second resting period includes a time period in the range of at least 48 hours to at least 72 hours, including all values and increments therein, such as in the range of 48 hours to 72 hours.

Figure 1B:
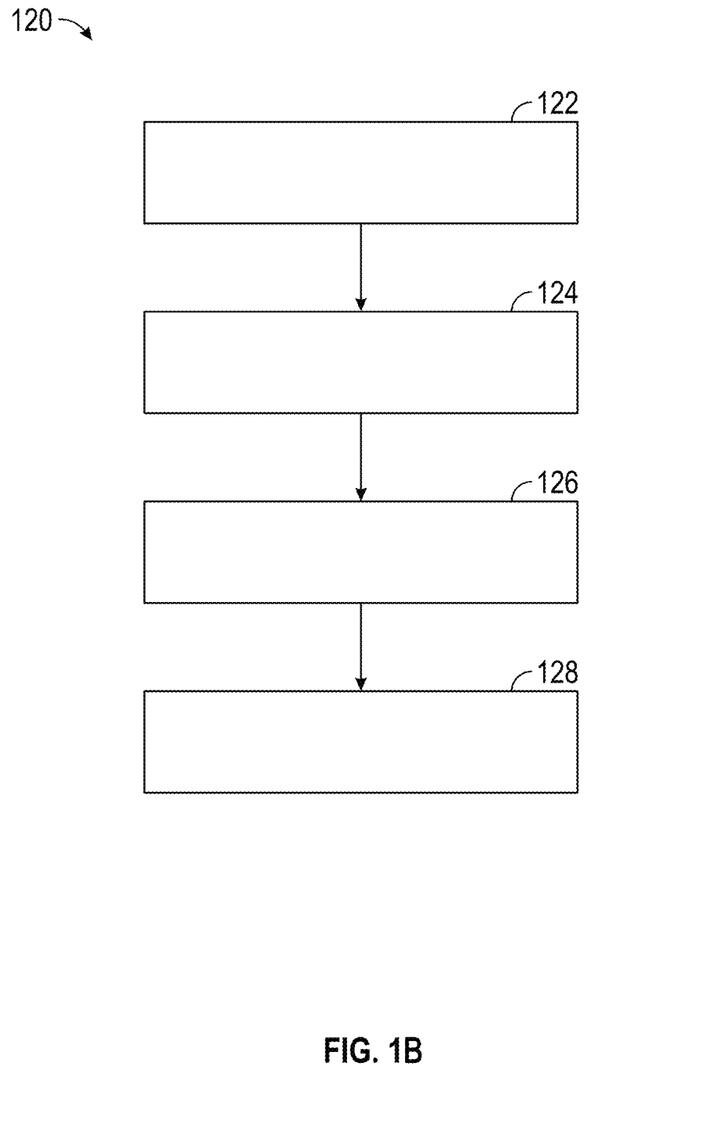
FIG. 1B illustrates a flow chart of another embodiment of a process of forming polyurethane foam incorporating lignin according to various aspects of the present disclosure.

Another embodiment 120 of the process is illustrated in FIG. 1B. At block 122 the polyol, lignin, gelation and blowing catalysts, and blowing agent may be combined together forming a polyol mixture. Then at block 124, the polyol mixture may optionally be allowed to rest, as described above with reference to block 104. Then, at block 126 the polymeric isocyanate is added to the polyol mixture to form the foam. At block 128, the foam is allowed to rest as described above with reference to block 110 of FIG. 1A.

Figure 1C:
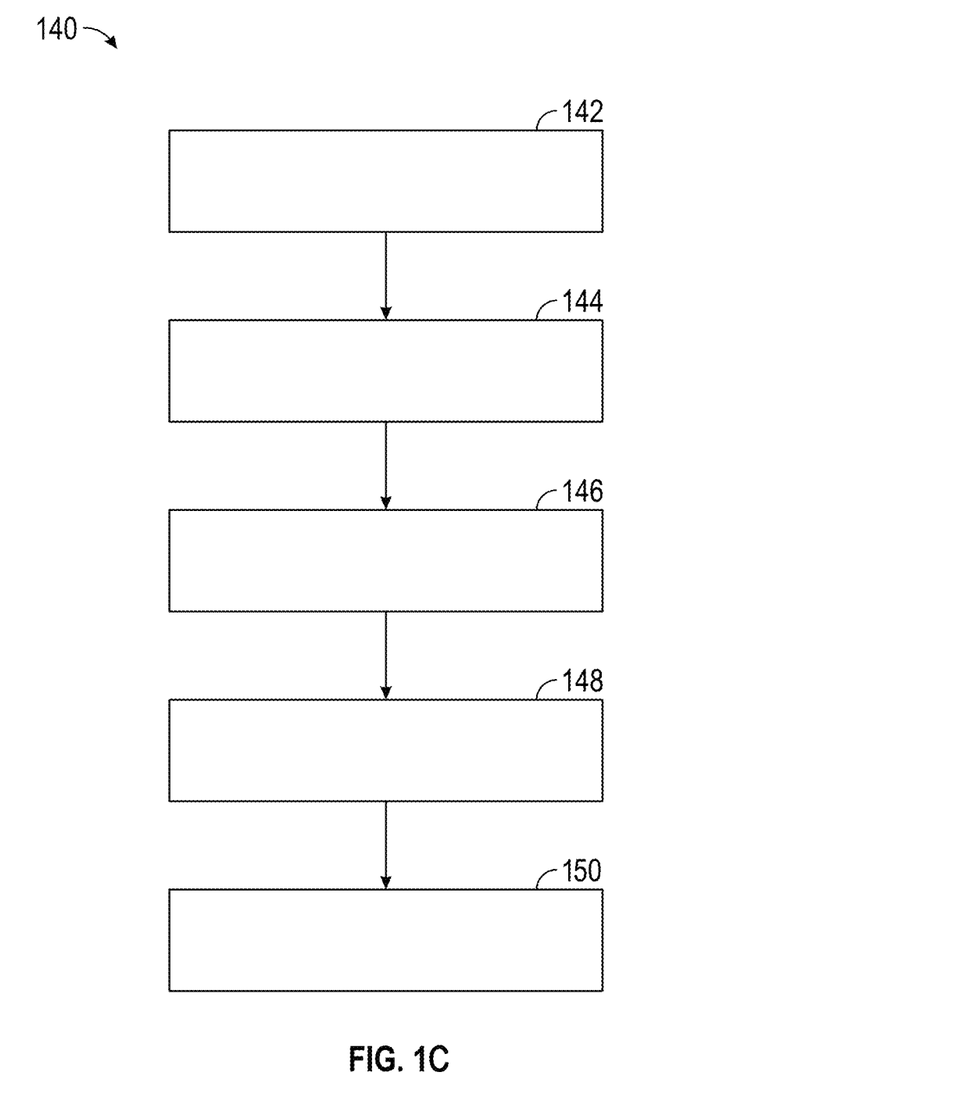
FIG. 1C illustrates a flow chart of a further embodiment of a process of forming polyurethane foam incorporating lignin according to various aspects of the present disclosure.

In yet a further embodiment of the process 140 illustrated in FIG. 1C, at block 142, the polyol, catalyst, and purified water are combined polyol precursor. The process then proceeds to block 144, wherein the lignin is added to form a polyol mixture. At block 146 the polyol mixture including the lignin is optionally allowed to rest as described above with reference to block 104. Then at block 148, the polymeric isocyanate is added to the polyol mixture including the lignin to form the foam. And finally, at block 150, the foam is allowed to rest as described with reference to block 110 of FIG. 1A.

In embodiments, the polyurethane foams are flexible foams. The flexible foams exhibit a density in the range of 20 kilograms per cubic meters to 250 kilograms per cubic meter, including all values and ranges therein, such as from 50 kilograms per cubic meter to 200 kilograms per cubic meter and from 110 kilograms per cubic meters to 125 kilograms per cubic meters. The density is measured by weighing a disc specimen 30 millimeters in diameter and 10 millimeters in thickness (actual foam measurements being confirmed using digital calipers).

Further, the flexible polyurethane foams also exhibit a compression set at 50% compression of equal to less than 40%, such as in the range of 5% to 30%, including all values and ranges therein, as measured via ISO 1856. Compression set was measured using 2.54 centimeter (1 inch) thick samples. The samples were compressed to a 50% displacement between two metal plates and placed in an oven at 70 degrees Celsius for 22 hours. After 22 hours, the samples were removed and allowed to recover for 30 minutes at ambient temperature. The foam thickness was then allowed to recover and compression set calculated by the following formula, Eq. 1.

$$((t_0 - t_f)/(t_0 - t_c)) * 100\%$$ Eq. 1.

Where $t_0$ is the initial thickness of the foam sample, $t_f$ is the thickness of the foam post compression, and $t_c$ is the thickness of the foam upon applying the 50% strain in compression.

Further, the flexible polyurethane foams exhibit an elastic modulus in the range of 1 kPa to 110 kPa, including all values and increments therein, such as from 25 kPa to 40 kPa as measured using a TA Instruments DMA 850 equipped with a compression clamp attachment. The testing samples were prepared by cutting the foam into a 30 millimeter in diameter disc of 10 millimeters in thickness. Logarithmic frequency sweep testing was conducted from 10 Hz with a constant displacement amplitude of 200 microns, held at 20 degrees Celsius with 5 points per decade. The initial load force and force tracking was held at 0.5 N and 200%, respectively.

In embodiments, the polyurethane foam is rigid and exhibits a density in the range of 20 kilograms per cubic meters to 800 kilograms per cubic meter, including all values and ranges therein, such as from 50 kilograms per cubic meter to 200 kilograms per cubic meter and from 110 kilograms per cubic meters to 125 kilograms per cubic meters. Again, the density is measured by weighing a disc specimen 30 millimeters in diameter and 10 millimeters in thickness (actual foam measurements being confirmed using digital calipers).

Further, the rigid polyurethane foam exhibits an elastic modulus in the range of greater than 110 kPa, including all values and increments therein, such as from 125 kPa to 450 kPa as measured using a TA Instruments DMA 850 equipped with a compression clamp attachment. The testing samples were prepared by cutting the foam into a 30 millimeter in diameter disc of 10 millimeters in thickness. Logarithmic frequency sweep testing was conducted from 10 Hz with a constant displacement amplitude of 200 microns, held at 20 degrees Celsius with 5 points per decade. The initial load force and force tracking was held at 0.5 N and 200%, respectively.

Figure 2:
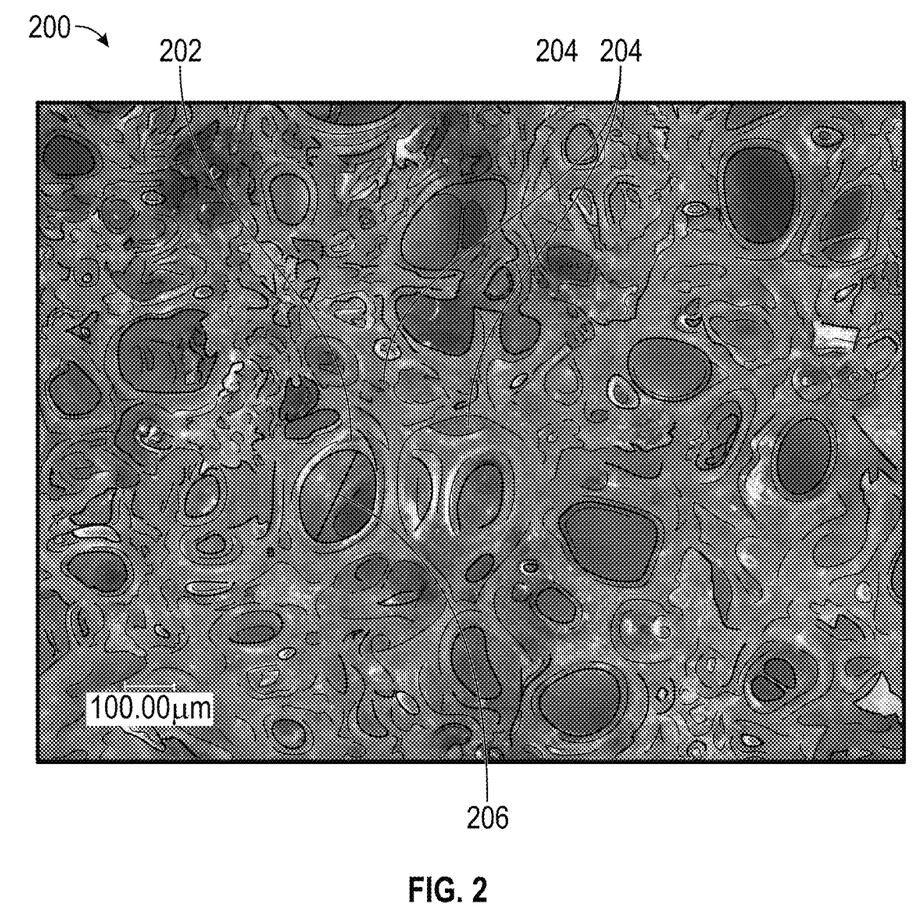
FIG. 2 illustrates a line drawing of an optical microscope image taken at 200× magnification of a polyurethane foam containing lignin according to various aspects of the present disclosure.

Imaging, such as the illustration of FIG. 2, indicates that the polyurethane foam 200 exhibits open cells 202 having a cell size 206 ranging between 50 micrometers to 200 micrometers, including all values and ranges therein. FIG. 2 illustrates an imaged block of foam, where the scale is 100 micrometers in length. Further, the lignin 204 is relatively evenly distributed throughout the volume of the polyurethan foam. The imaging shows that at least 95% and, in embodiments, at least 99% of the lignin 204 particulate observed is less than 200 micrometers in length, including all values and ranges therein, such as less than 100 micrometers, less than 50 micrometers, less than 10 micrometers, less than 5 micrometers, as measured in imaging. Imaging was performed using an optical microscope at magnifications of 50× to 500×.

Figure 3:
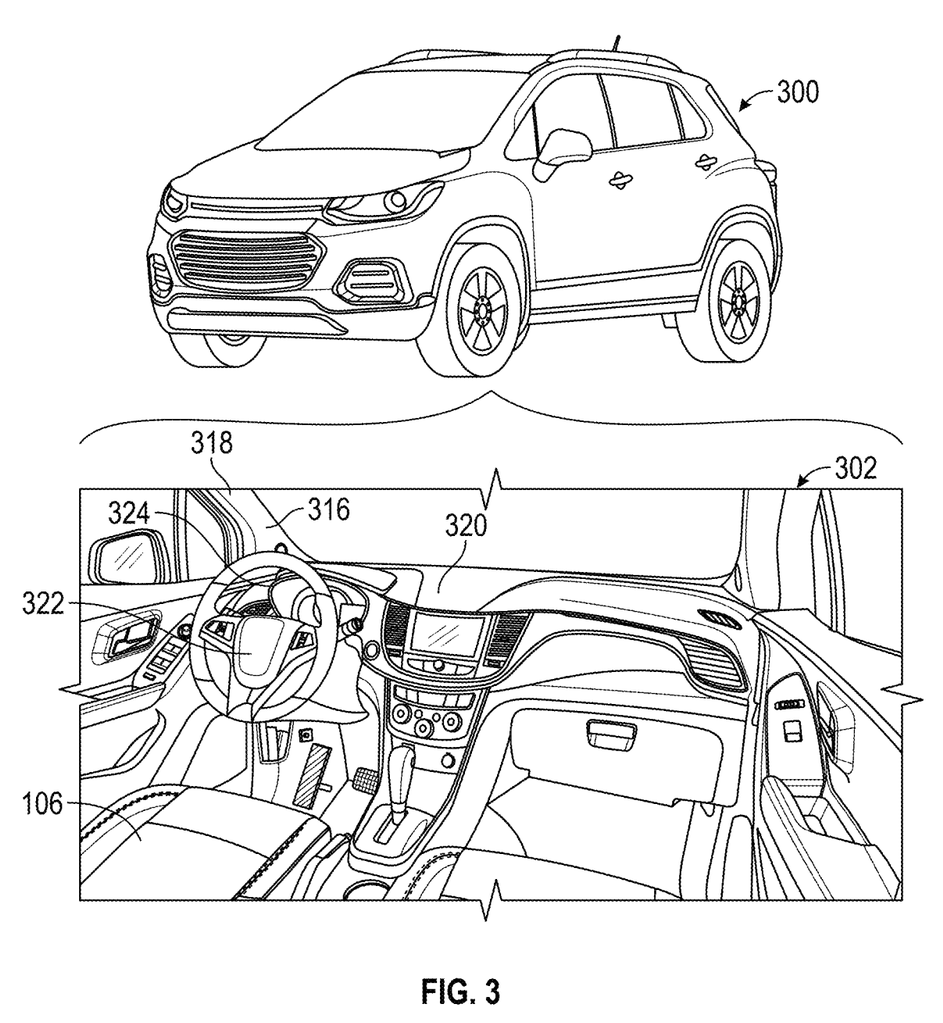
FIG. 3 illustrates an embodiment of a vehicle including a polyurethane foam with lignin incorporated therein according to various aspects the present disclosure.

Polyurethane foams created from the processes described above may be incorporated into various vehicle applications. Reference is made to FIG. 3, which illustrates a vehicle 300 and the interior 302 of the vehicle 300. Within the interior 302 is illustrated a number of applications in which the flexible polyurethane foams including the unmodified lignin may be employed. The applications include acoustic applications, damping applications and insulating applications. The polyurethane foams are incorporated in, for example, one or more of the following vehicle components: the seats 312, headrests (not illustrated), arm rests 314, the headliner 316, which is illustrated as extending down the A-pillar 318, console 320, steering wheel 322 and instrument panel 324.

EXAMPLES

The following examples and comparative examples are provided to further illustrate the subject matter discussed herein. The concepts and features of the following examples may be combined with each other in numerous ways as will be apparent to those of ordinary skill in the art in view of the teachings herein.

The following materials were utilized in the preparation of the examples and comparative examples utilized herein. Polyols include poly(tetrahydrofuran) (pTHF 2900) (Mn ~2,900), glycerol propoxylate, VELVETOL H2700 propylene diol available from Allessa, JEFFOL PPG-2000 (~2000 Mn) polypropylene glycol available from Huntsman Corp., and PLURACOL 380 polyethylene glycol—polypropylene glycol copolymer available from BASF. UPM BIOPIVA 395 kraft lignin available from UPM Biochemicals. Catalysts include dibutyltin dilaurate (DBTDL) and dimethylcyclohexylamine (DMCHA) available from Sigma Aldrich as well as cyclic tertiary amine TEGOAMIN E 10 available from Evonik. It is further noted that the TEGOAMIN E 10 includes polyether siloxane and an emulsifier. Surfactants include VORASURF DC 6070 silicone surfactant available from DOW. Methylene diphenyl diisocyanate (MDI) available from TCI Chemicals and MONDUR MR LIGHT available from Covestro. In addition, Max 100 Long FLACKTEK cups available from Fischer Scientific were used in mixing, 0.47 liter (16 ounce) polyester cups available from Prestee, and 5.08 cm (2 inch) diameter GF disperser blade from Gardco were also utilized in the examples set forth below.

Comparative Example 1: Synthesis of Polyol Prepolymer

VELVETOL H2700 polypropylene diol (50.0 g, 2 equivalents), polymeric methylene diphenyl diisocyante (2.32 g, 1 equivalent), and dibutyltin dilaurate (400 mg) were added to a MAX 100 Long FLACKTEK cup and heated at 80° C. for 30 minutes. Once heated, the vessel was placed in a FLACKTEK centrifugal mixer and mixed at 2000 rpm for 2 minutes. The mixture was then allowed to sit at room temperature (RT), for at least 24 hours before use in foam synthesis. The theoretical number average molecular weight (Mn) of the prepolymer is 5650 g/mol.

Comparative Example 2: Synthesis of Polyol Prepolymer pTHF 2900 polytetrahydrofuran (50.0 g, 2 equivalents), polymeric methylene diphenyl diisocyanate (2.16 g, 1 equivalent), and dibutyltin dilaurate (400 mg) were added to a MAX 100 Long FLACKTEK cup and heated at 80° C. for 30 minutes. Once heated, the vessel was placed in a FLACKTEK centrifugal mixer and mixed at 2000 rpm for 2 minutes. The mixture was then allowed to sit at room temperature for at least 24 hours before use in foam synthesis. The theoretical Mn of the prepolymer is 6050 g/mol.

Comparative Example 3: Synthesis of Polyol Prepolymer

Jeffol PPG-2000 polypropylene glycol (50.0 g, 2 equivalents), polymeric methylene diphenyl diisocyante (3.13 g, 1 equivalent), and dibutyltin dilaurate (400 mg) were added to a MAX 100 Long FLACKTEK cup and heated at 80° C. for 30 minutes. Once heated, the vessel was placed in a FLACKTEK centrifugal mixer and mixed at 2000 rpm for 2 minutes. The mixture was then allowed to sit at room temperature for at least 24 hours before use in foam synthesis. The theoretical Mn of the prepolymer is 4250 g/mol.

The above comparative polyol precursor systems (Comparative Examples 1 through 3) formulated to form an alcohol terminated, linear, polyol prepolymers were then crosslinked with the diisocyanate as set forth in the comparative examples below.

Comparative Example 4: Synthesis of Base Foam 1

The polyol prepolymer of Comparative Example 1 (16.0 g, 80 parts per hundred resin (phr)), glycerol propoxylate (4 g, 20 phr), and VORASURF DC 6070 silicone surfactant (400 mg, 2 phr) were added to a 16 oz PET cup. The components were stirred with disperser blade attached to an overhead mixer set to 2000 rpm for 1 minute. DBTDL (272 mg), DMCHA (200 mg), and deionized water (300 mg) were added to the cup with the polyols and surfactant. The contents of the cup were then mixed at 2000 rpm with the same disperser blade and overhead mixer. Once mixed, MONDUR MR LIGHT polymeric methylene diphenyl diisocyanate (11.1 g, 1 equivalent with respect to (with respect to the) polyol) was added to the cup, followed by 15 seconds of mixing with the disperser blade at 2000 rpm.

Comparative Example 5: Synthesis of Base Foam 2

The polyol prepolymer of Comparative Example 2 (16.0 g, 80 phr), glycerol propoxylate (4 g, 20 phr), and VORASURF DC 6070 silicone surfactant (400 mg, 2 phr) were added to a 16 oz PET cup. The components were stirred with disperser blade attached to an overhead mixer set to 2000 rpm for 1 minute. DBTDL (272 mg), DMCHA (200 mg), and deionized water (300 mg) were added to the cup with the polyols and surfactant. The contents of the cup were then mixed at 2000 rpm with the same disperser blade and overhead mixer. Once mixed, MONDUR MR LIGHT polymeric methylene diphenyl diisocyanate (11.1 g, 1 equivalent with respect to the polyol) was added to the cup, followed by 15 seconds of mixing with the disperser blade at 2000 rpm.

Comparative Example 6: Synthesis of Base Foam 3

The polyol prepolymer of Comparative Example 3 (16.0 g, 80 phr), glycerol propoxylate (4 g, 20 phr), and VORASURF DC 6070 silicone surfactant (400 mg, 2 phr) were added to a 16 oz PET cup. The components were stirred with disperser blade attached to an overhead mixer set to 2000 rpm for 1 minute. DBTDL (272 mg), DMCHA (200 mg), and deionized water (300 mg) were added to the cup with the polyols and surfactant. The contents of the cup were then mixed at 2000 rpm with the same disperser blade and overhead mixer. Once mixed, MONDUR MR LIGHT polymeric methylene diphenyl diisocyanate (11.3 g, 1 equivalent with respect to the polyol) was added to the cup, followed by 15 seconds of mixing with the disperser blade at 2000 rpm.

Comparative Example 7: Synthesis of Base Foam 1 Containing 20% Kraft Lignin

The polyol prepolymer of Comparative Example 1 (16.0 g, 80 phr), UPM 395 Kraft Lignin (4.00 g, 20 phr), and VORASURF DC 6070 (400 mg, 2 phr) were added to a MAX 100 Long FLACKTEK cup. The contents were mixed at 2000 rpm for 5 minutes in a FLACKTEK mixer. To the mixed contents, DBTDL (272 mg, 1.36 phr), DMCHA (200 mg, 1 phr), and deionized water (50.0 mg, 0.25 phr) were added and mixed at 2000 rpm for 1 minute using disperser blade attached to an overhead mixer. Once mixed, MONDUR MR LIGHT polymeric methylene diphenyl diisocyanate (MDI) (6.15 g, 1 equivalent with respect to the polyol) was added to the contents of the cup and mixed at 2000 rpm with the same overhead mixer for 15 seconds. Foam was allowed to rest at room temperature for at least 72 hours before mechanical analysis.

Comparative Example 8: Synthesis of Base Foam 2 Containing 20 Phr Kraft Lignin

The polyol prepolymer of Comparative Example 2 (16.0 g, 80 phr), UPM 395 Kraft Lignin (4.00 g, 20 phr), and VORASURF DC 6070 silicone surfactant (400 mg, 2 phr) were added to a MAX 100 Long FLACKTEK cup. The contents were mixed at 2000 rpm for 5 minutes in a FLACKTEK mixer. To the mixed contents, DBTDL (272 mg, 1.36 phr), DMCHA (200 mg, 1 phr), and deionized water (50.0 mg, 0.25 phr) were added and mixed at 2000 rpm for 1 minute using disperser blade attached to an overhead mixer. Once mixed, MONDUR MR LIGHT polymeric methylene diphenyl diisocyanate (6.10 g, 1 equivalent with respect to the polyol) was added to the contents of the cup and mixed at 2000 rpm with the same overhead mixer for 15 seconds. Foam was allowed to rest at room temperature for at least 72 hours before mechanical analysis.

Comparative Example 9: Synthesis of Base Foam 3 Containing 20 Phr Kraft Lignin

The polyol prepolymer of Comparative Example 3 (16.0 g, 80 phr), UPM 395 Kraft Lignin (4.00 g, 20 phr), and VORASURF DC 6070 silicone surfactant (400 mg, 2 phr) were added to a MAX 100 Long FLACKTEK cup. The contents were mixed at 2000 rpm for 5 minutes in a FLACKTEK mixer. To the mixed contents, DBTDL (272 mg, 1.36 phr), DMCHA (200 mg, 1 phr), and deionized water (50.0 mg, 0.25 phr) were added and mixed at 2000 rpm for 1 minute using disperser blade attached to an overhead mixer. Once mixed, MONDUR MR LIGHT polymeric methylene diphenyl diisocyanate (6.40 g, 1 equivalent with respect to the polyol) was added to the contents of the cup and mixed at 2000 rpm with the same overhead mixer for 15 seconds. Foam was allowed to rest at room temperature for at least 72 hours before mechanical analysis.

Example 10: Synthesis of Base Foam 1

To form the polyol mixture, PLURACOL 380 polyethylene glycol—polypropylene glycol copolymer (20.0 g, 100 phr) and VORASURF DC 6070 silicone surfactant (400 mg, 2 phr) were added to a MAX 100 Long FLACKTEK cup. The contents were mixed at 2000 rpm for 5 minutes in a FLACKTEK mixer. To the mixed contents of the polyol mixture, DBTDL (400 mg, 2 phr), amine catalyst TEGOAMIN E 10 (100 mg, 0.5 phr), and deionized water (200 mg, 1 phr) were added and mixed at 2000 rpm for 1 minute using disperser blade attached to an overhead mixer forming a polyol mixture. Once mixed, MONDUR MR LIGHT polymeric methylene diphenyl diisocyanate (4.15 g, 1 equivalent with respect to the polyol) was added to the contents of the cup and mixed at 2000 rpm with the same overhead mixer for 15 seconds. Foam was allowed to rest at room temperature for at least 72 hours before mechanical analysis.

Example 11: Synthesis of Base Foam with 10 Phr Lignin

To form the polyol mixture, PLURACOL 380 polyethylene glycol—polypropylene glycol copolymer (18.0 g, 90 phr), UPM 395 Kraft Lignin (2.00 g, 10 phr) and VORASURF DC 6070 silicone surfactant (400 mg, 2 phr) were added to a MAX 100 Long FLACKTEK cup. The contents were mixed at 2000 rpm for 5 minutes in a FLACKTEK mixer. To the mixed polyol mixture, DBTDL (400 mg, 2 phr), amine catalyst TEGOAMIN E 10 (100 mg, 0.5 phr), and deionized water (100 mg, 0.5 phr) were added and mixed at 2000 rpm for 1 minute using disperser blade attached to an overhead mixer forming a polyol mixture. Once mixed, MONDUR MR LIGHT polymeric methylene diphenyl diisocyanate (4.53 g, 1 equivalent with respect to the polyol) was added to the contents of the cup and mixed at 2000 rpm with the same overhead mixer for 15 seconds. Foam was allowed to rest at room temperature for at least 72 hours before mechanical analysis.

Example 12: Synthesis of Base Foam with 20 Phr Lignin

To form the polyol mixture, PLURACOL 380 polyethylene glycol—polypropylene glycol copolymer (16.0 g, 80 phr), UPM 395 Kraft Lignin (4.00 g, 20 phr) and VORASURF DC 6070 silicone surfactant (400 mg, 2 phr) were added to a MAX 100 Long FLACKTEK cup. The contents were mixed at 2000 rpm for 5 minutes in a FLACKTEK mixer. To the mixed contents of the polyol mixture, DBTDL (400 mg, 2 phr) and amine catalyst TEGOAMIN E 10 (100 mg, 0.5 phr) were added and mixed at 2000 rpm for 1 minute using disperser blade attached to an overhead mixer forming a polyol mixture. Once mixed, MONDUR MR LIGHT polymeric methylene diphenyl diisocyanate (4.91 g, 1 equivalent with respect to the polyol) was added to the contents of the cup and mixed at 2000 rpm with the same overhead mixer for 15 seconds. Foam was allowed to rest at room temperature for at least 72 hours before mechanical analysis.

Example 13: Synthesis of Base Foam with 30 Phr Lignin

To form the polyol mixture PLURACOL 380 polyethylene glycol—polypropylene glycol copolymer (14.0 g, 70 phr), UPM 395 Kraft Lignin (6.00 g, 30 phr) and VORASURF DC 6070 silicone surfactant (400 mg, 2 phr) were added to a MAX 100 Long FLACKTEK cup. The contents were mixed at 2000 rpm for 5 minutes in a FLACKTEK mixer. To the mixed contents of the polyol mixture, DBTDL (400 mg, 2 phr) and amine catalyst TEGOAMIN E 10 (100 mg, 0.5 phr) were added and mixed at 2000 rpm for 1 minute using disperser blade attached to an overhead mixer. Once mixed, MONDUR MR LIGHT polymeric methylene diphenyl diisocyanate (6.76 g, 1 equivalent with respect to the polyol) was added to the contents of the cup and mixed at 2000 rpm with the same overhead mixer for 15 seconds. Foam was allowed to rest at room temperature for at least 72 hours before mechanical analysis.

Example 14: Synthesis of Base Foam with 30 Phr Lignin with Reduced pMDI

To form the polyol mixture PLURACOL 380 polyethylene glycol—polypropylene glycol copolymer (14.0 g, 70 phr), UPM 395 Kraft Lignin (6.00 g, 30 phr) and VORASURF DC 6070 silicone surfactant (400 mg, 2 phr) were added to a MAX 100 Long FLACKTEK cup. The contents were mixed at 2000 rpm for 5 minutes in a FLACKTEK mixer. To the mixed contents of the polyol mixture, DBTDL (400 mg, 2 phr) and amine catalyst TEGOAMIN E 10 (100 mg, 0.5 phr) were added were added and mixed at 2000 rpm for 1 minute using disperser blade attached to an overhead mixer. Once mixed, MONDUR MR LIGHT polymeric methylene diphenyl diisocyanate (5.07 g, Index 75) was added to the contents of the cup and mixed at 2000 rpm with the same overhead mixer for 15 seconds. Foam was allowed to rest at room temperature for at least 72 hours before mechanical analysis.

Example 15: Synthesis of Base Foam with 30 Phr Lignin with Reduced pMDI

To form the polyol mixture PLURACOL 380 polyethylene glycol—polypropylene glycol copolymer (14.0 g, 70 phr), UPM 395 Kraft Lignin (6.00 g, 30 phr) and VORASURF DC 6070 silicone surfactant (400 mg, 2 phr) were added to a MAX 100 Long FLACKTEK cup. The contents were mixed at 2000 rpm for 5 minutes in a FLACKTEK mixer. To the mixed contents of the polyol mixture, DBTDL (400 mg, 2 phr) and amine catalyst TEGOAMIN E 10 (100 mg, 0.5 phr) were added and mixed at 2000 rpm for 1 minute using disperser blade attached to an overhead mixer. Once mixed, MONDUR MR LIGHT polymeric methylene diphenyl diisocyanate (3.38 g, Index 50) was added to the contents of the cup and mixed at 2000 rpm with the same overhead mixer for 15 seconds. Foam was allowed to rest at room temperature for at least 72 hours before mechanical analysis.

Characterization

Various aspects of the foams created in the examples and comparative examples were characterized.

Theoretical Molecular Weight

The theoretical molecular weight was calculated for the alternative polyol precursors and presented in Table 1, below. The Flory-Schulz distribution (Prog. Polym. Sci. Vol 16, 695-836, 1991) was used to calculate theoretical molecular weight.

TABLE 1

Polyol prepolymer theoretical molecular weight.

| | Precursor character | Precursor MW | OH/NCO ratio | Prepolymer MW |
|---|---|---|---|---|
| Comparative Example 1 | Poly(propane diol) | $M_n$ = 2700 g/mol | 2 | $M_n$ = 5650 g/mol |
| Comparative Example 2 | Poly(tetrahydrofuran) | $M_n$ = 2900 g/mol | 2 | $M_n$ = 6050 g/mol |
| Comparative Example 3 | Poly(propylene glycol) | $M_n$ = 2000 g/mol | 2 | $M_n$ = 4250 g/mol |

Density

From the main cured foam block of each Example and Comparative Example, an approximately 10 mm thick cross section was cut. Once cut, a 30 mm die cutter was used to axially punch a 30 mm diameter disc from the 10 mm thick cross section, resulting in a cylindrical foam piece with dimensions approximately 10 mm by 30 mm. Actual measurements were confirmed using digital calipers on an individual foam sample basis. Cut pieces of foam were then weighed using a laboratory balance, allowing for calculation of individual foam density. Table 2 presents a summary of all density measurements for reference.

TABLE 2

Density of the foams presented in the examples and comparative examples.

| Example | Density (kg/m3) |
|---|---|
| CE 4 | 75 |
| CE 5 | 79 |
| CE 6 | 95 |
| CE 7 | 98 |
| CE 8 | 108 |
| CE 9 | 113 |
| E 10 | 130 |
| E 11 | 120 |
| E 12 | 115 |
| E 13 | 95 |
| E 14 | 110 |
| E 15 | 200 |

Compression Set

Compression set was conducted according to ISO 1856: 2018. Foams following Comparative Examples 4 through 9 and Examples 10 through 13 were cut to approximately 2.54 centimeter (1 inch) thick sections and compressed to 50% displacement between two metal plates. The compressed foam sections were then placed in an oven at 70° C. and held at that temperature for 22 hours. After 22 hours, the foam sections held between the two plates were removed from the oven and removed from the compression set jig. After allowing to recover for 30 minutes at ambient temperature, the foam section thicknesses were measured using digital calipers. Compression set was calculated according to Equation 1 (Eq. 1), reproduced again below.

$$\frac{t_0 - t_f}{t_0 - t_c} * 100\% \qquad \text{Eq. 1}$$

where is $t_0$ the initial thickness measured, $t_f$ is the post compression thickness, and $t_c$ is the 50% compression displacement thickness. Table 3, below, reports the compression set scores all of polyurethane foams.

TABLE 3

Compression set values for the foams of the examples and comparative examples.

| Example | Compression Set (%) |
|---|---|
| CE 4 | 95 |
| CE 5 | 92 |
| CE 6 | 65 |
| CE 7 | 55 |
| CE 8 | 35 |
| CE 9 | 34 |
| E 10 | 3.5 |
| E 11 | 17 |
| E 12 | 17 |
| E 13 | 82 |
| E 14 | 11.5 |
| E 15 | 2.4 |

Elastic Modulus

Elastic modulus data was obtained through the use of a TA Instruments DMA 850 equipped with a compression clamp attachment. Die cut pieces of foams resulting from Comparative Examples 4 through 9 and Examples 10 through 13 used for density calculations were used for determination of modulus. Logarithmic frequency sweep testing was conducted from 1 Hz to 50 Hz with a constant displacement amplitude of 200 microns, held at 20° C. with 5 points per decade. Initial load force and force tracking were held at 0.5 N and 200%, respectively. Comparative modulus data was taken and reported at 10 Hz. Table 4, below, reports the measured storage modulus of the Examples and Comparative Examples.

TABLE 4

Storage modulus of the foam of the examples and comparative examples selected from 10 Hz frequency of compression at 200 microns.

| Example | Modulus (kPa) |
|---|---|
| CE 4 | 545 |
| CE 5 | 715 |
| CE 6 | 62 |
| CE 7 | 50 |
| CE 8 | 40 |
| CE 9 | 10 |
| E 10 | 5.8 |
| E 11 | 26 |
| E 12 | 36 |
| E 13 | 151 |
| E 14 | 41 |
| E 15 | 93 |

Optical Imaging.

Imaging of foam cross sections was conducted using a Keyence optical microscope. Images were collected with ranging magnifications from 50× to 500× in order to analyze porosity, foam cell morphology, and lignin dispersion when pertinent.

It was found that the ability of all of the polyol prepolymers of the comparative examples to disperse the unmodified Kraft lignin was observed as being poor, leaving aggregated inclusions of lignin. On the other hand, it was found that lignin dispersion in the Examples were relatively more uniform. In addition, the particle sizes of the lignin agglomerates were reduced as determined by measurements made using the optical microscope.

Additional Examples

Examples 11 Through 13: Overnight Rest Period

Examples 11 through 13 were repeated. The polyol mixture was allowed to sit overnight, approximately 24 hours, prior to combining with the catalysts and water to form the polyol mixture to facilitate increased lignin dispersion in polyol. These examples were then evaluated again for modulus and compression set and the results are presented in Table 5 below. This demonstrates that the rigidity of the foam may be adjusted by allowing the polyether polyol precursors to sit for a few hours.

TABLE 5

Modulus and compression set of Examples 11 through 13 after allowing the mixture of lignin and polyethylene glycol and propylene glycol copolymer polyol.

|  | Modulus (kPa) | Comp Set (%) |
|---|---|---|
| Example 10 | — | — |
| Example 11 | 5.4 | 43 |
| Example 12 | 60 | 83 |
| Example 13 | 207 | 92 |

Replicates

Three replicates were prepared from Examples 10 through 13 using the technique of mixing polyol and lignin before promptly blowing foams to better determine consistency of properties. Table 6 below reports the average±standard deviation (SD) of density, storage modulus and compression set of all these samples. It can be seen that the SD compared to the average value shows narrow distributions.

TABLE 6

Average replicate density, average storage modulus, and average 50% compression set of replicates of Examples 10 through 13.

|  | Precursor character | Lignin (phr) | Ave. Replicate Density (kg/m3) | Ave. Modulus (kPa) | Average 50% Comp. Set (%) |
|---|---|---|---|---|---|
| Example 10 | PLURACOL 380 | 0 | n/a | 20* | 3.5 |
| Example 11 | PLURACOL 380 | 10 | 121 ±17 | 26 ±13 | 17 ±16 |
| Example 12 | PLURACOL 380 | 20 | 115 ±14 | 36 ±11 | 17 ±15 |
| Example 13 | PLURACOL 380 | 30 | 95 ±19 | 151 ±22 | 82 ± 0.3 |

*not averaged

The polyurethane foams and methods herein offer several advantages. Such advantages include, but are not limited to, the ability to incorporate lignin into polyurethane without additional chemical modification or treatment of the lignin, thus reducing the total amount of greenhouse gases released. Further advantages include the ability to incorporate lignin in an amount of up to 30 parts per hundred resin of polyol.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A polyurethane foam, comprising a reaction product of:
   a polyol mixture including polyethylene glycol and polypropylene glycol copolymer polyol,
   a gelation catalyst,
   a blowing catalyst,
   lignin, and
   a blowing agent, wherein the blowing agent includes, at least in part, water carried by the lignin and wherein the lignin includes water present at less than or equal to 6 weight percent of the total weight of the lignin; and
   a polymeric isocyanate, wherein the polymeric isocyanate is added to the polyol mixture in a weight ratio of 1 part of the polymeric isocyanate to in the range of 4 to 6 parts of the polyol mixture.

2. The polyurethane foam of claim 1, wherein the lignin is present in a range of 10 parts per hundred resin to 30 parts per hundred resin of the polyol, wherein the polyol includes the polyethylene glycol and polypropylene glycol copolymer polyol and the lignin.

3. The polyurethane foam of claim 2, wherein the polyethylene glycol and polypropylene copolymer polyol is present in a range of 65 parts per hundred resin to 95 parts per hundred resin of the polyol.

4. The polyurethane foam of claim 2, wherein the lignin is kraft lignin.

5. The polyurethane foam of claim 2, wherein the lignin is an unmodified lignin and exhibits a particle size of less than 200 micrometers in length.

6. The polyurethane foam of claim 2, wherein the water is present in a range of 0.1 parts per hundred resin to 6 parts per hundred resin of the polyol.

7. The polyurethane foam of claim 2, wherein the mixture further includes a surfactant.

8. The polyurethane foam of claim 7, wherein the surfactant is an organo-modified polysiloxane present in a range of 0.1 parts per hundred resin to 5 parts per hundred resin of the polyol.

9. The polyurethane foam of claim 2, wherein the gelation catalyst comprises a dibutyltin dilaurate catalyst and a tertiary amine catalyst.

10. The polyurethane foam of claim 9, wherein the dibutyltin dilaurate catalyst is present in a range of 0.1 parts per hundred resin to 5 parts per hundred resin of the polyol and the tertiary amine catalyst is present in a range of 0.1 parts per hundred resin to 5 parts per hundred resin of the polyol.

11. The polyurethane foam of claim 2, further including a crosslinker.

12. The polyurethane foam of claim 2, wherein the polymeric isocyanate is present in a range of 0.5 to 1 equivalent to the polyol.

13. The polyurethane foam of claim 12, wherein the polymeric isocyanate is methylene diphenyl diisocyanate.

14. A vehicle component, comprising:
   a polyurethane foam, the polyurethane foam including a reaction product of:
   a polyol mixture of polyethylene glycol and polypropylene glycol copolymer polyol, a gelation catalyst, a blowing catalyst, lignin, and a blowing agent, wherein the blowing agent includes, at least in part, water carried by the lignin and wherein the lignin includes water present at less than or equal to 6 weight percent of the total weight of the lignin, and a polymeric isocyanate, wherein the polymeric isocyanate is added to the polyol mixture in a weight ratio of 1 part of the polymeric isocyanate to in the range of 4 to 6 parts of the polyol mixture.

15. The vehicle component of claim 14, wherein the polyurethane foam exhibits a density in a range of 20 kilograms per cubic meters to 250 kilograms per cubic meter, a compression set at 50% compression in a range of less than 40, and a modulus in a range of 1 kPa to 110 kPa.

16. The vehicle component of claim 14, wherein the polyurethane foam exhibits a density in a range of 20 kilograms per cubic meters to 800 kilograms per cubic meter and an elastic modulus of greater than 110 kPa.

17. The vehicle component of claim 14, wherein the vehicle component comprises one of a seat, a headrest, an arm rest, a headliner, a steering wheel, an instrument panel, and a console.

18. A method of forming a polyurethane foam, comprising:
mixing a polyol mixture including polyethylene glycol and polypropylene glycol copolymer polyol, a gelation catalyst, a blowing catalyst, lignin, and a blowing agent, with a polymeric isocyanate, wherein the blowing agent includes, at least in part, water carried by the lignin and wherein the lignin includes water present at less than or equal to 6 weight percent of the total weight of the lignin and wherein the polymeric isocyanate is added to the polyol mixture in a weight ratio of 1 part of the polymeric isocyanate to in the range of 4 to 6 parts of the polyol mixture.

19. The method of claim 18, further comprising mixing the polyethylene glycol and polypropylene copolymer polyol with the lignin prior to mixing in the gelation catalyst, the blowing catalyst, the blowing agent and polymeric isocyanate.

20. The method of claim 19, further comprising allowing the polyethylene glycol and polypropylene copolymer polyol with the lignin to rest prior to mixing in the gelation catalyst, the blowing catalyst, the blowing agent and polymeric isocyanate.

* * * * *